United States Patent
Odom et al.

(10) Patent No.: US 9,992,269 B1
(45) Date of Patent: Jun. 5, 2018

(54) DISTRIBUTED COMPLEX EVENT PROCESSING

(71) Applicant: EMC IP Holding Company LLC, Hopkinton, MA (US)

(72) Inventors: Jeffrey M. Odom, Falls Church, VA (US); Michael P. Fikes, Leesburg, VA (US); John Swift, Leesburg, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 287 days.

(21) Appl. No.: 14/189,326

(22) Filed: Feb. 25, 2014

Related U.S. Application Data

(60) Provisional application No. 61/769,177, filed on Feb. 25, 2013.

(51) Int. Cl.
*G06F 15/16* (2006.01)
*H04L 29/08* (2006.01)

(52) U.S. Cl.
CPC .................... *H04L 67/10* (2013.01)

(58) Field of Classification Search
CPC ..... H04L 67/1097; H04L 67/10; H04L 67/02; H04L 63/14; H04L 43/08; G06F 17/30864; G06F 17/30194; G06F 17/30516; G06F 17/30507; G06F 9/5066; G06F 3/067
USPC .......................... 709/201, 203, 224; 707/769
See application file for complete search history.

(56) References Cited

U.S. PATENT DOCUMENTS

| | | | | |
|---|---|---|---|---|
| 7,650,331 | B1* | 1/2010 | Dean ..................... | G06F 9/5066 712/203 |
| 8,677,003 | B1* | 3/2014 | Brashear ............... | H04L 65/608 709/231 |
| 2006/0106915 | A1* | 5/2006 | Fujisawa ................ | H04L 67/02 709/208 |
| 2007/0011241 | A1* | 1/2007 | Kawabe ................ | G06F 9/5072 709/205 |
| 2009/0080864 | A1* | 3/2009 | Rajakarunanayake .. | H04N 5/76 386/200 |
| 2009/0177640 | A1* | 7/2009 | Verbaere ........... | G06F 17/30395 |
| 2009/0271468 | A1* | 10/2009 | DiStefano ............... | H04L 67/10 709/201 |
| 2010/0017380 | A1* | 1/2010 | Naibo ............... | G06F 17/30398 707/E17.136 |

(Continued)

OTHER PUBLICATIONS

Kleiminger, Wilhelm. "Stream Processing in the Cloud." MEng Honours degree in Computing of Imperial College (2011).*

(Continued)

*Primary Examiner* — Ranodhi Serrao
(74) *Attorney, Agent, or Firm* — Ryan, Mason & Lewis, LLP

(57) ABSTRACT

A complex event query specification may be constructed that a complex event processing engine uses to analyze an event stream for an occurrence of a complex event. Event data stored in a distributed file system are mapped to respective instances of the complex event processing engine in respective distributed event streams. The distributed event streams are analyzed by the independently executing complex event processing engines in accordance with the complex event query specification. The occurrence of the complex event in any of the distributed event streams is indicated at the output of the complex event processing engines.

18 Claims, 11 Drawing Sheets

(56) References Cited

U.S. PATENT DOCUMENTS

| | | | | | |
|---|---|---|---|---|---|
| 2010/0125545 | A1* | 5/2010 | Navas | ............... | G06F 17/30516 707/602 |
| 2011/0093631 | A1* | 4/2011 | Gerea | ..................... | G06F 9/542 710/104 |
| 2011/0313844 | A1* | 12/2011 | Chandramouli | ... | G06Q 30/0241 705/14.42 |
| 2011/0314019 | A1* | 12/2011 | Jimenez Peris | ....... | G06F 9/5066 707/737 |
| 2012/0078975 | A1* | 3/2012 | Chen | ................ | G06F 17/30516 707/803 |
| 2013/0152088 | A1* | 6/2013 | Gkantsidis | ........ | G06F 17/30386 718/100 |
| 2013/0290368 | A1* | 10/2013 | Chen | ................ | G06F 17/30536 707/769 |
| 2014/0046909 | A1* | 2/2014 | Patiejunas | ......... | G06F 17/30289 707/687 |
| 2014/0123132 | A1* | 5/2014 | Alicherry | .............. | G06F 9/5005 718/1 |
| 2014/0236983 | A1* | 8/2014 | Alves | ................ | G06F 17/30548 707/769 |

OTHER PUBLICATIONS

Alves, David, Pedro Bizarro, and Paulo Marques. "Flood: elastic streaming mapreduce." Proceedings of the Fourth ACM International Conference on Distributed Event-Based Systems. ACM, 2010.*

Ho, Ricky, "Map Reduce and Stream Processing", Retrieved at <<http://horicky.blogspot.com/2010/11 /map-reduce-and-stream-process- ing.html>>, Nov. 5, 2010.*

Brito, Andrey, et al. "Scalable and low-latency data processing with stream mapreduce." Cloud Computing Technology and Science (CloudCom), 2011 IEEE Third International Conference on. IEEE, 2011.*

Sakr, Sherif, Anna Liu, and Ayman G. Fayoumi. "The family of mapreduce and large-scale data processing systems." ACM Computing Surveys (CSUR) 46.1 (2013): 11.*

Manohar et al., "Δ-Dataflow Networks for Event Stream Processing", 2004, 6 pages.

* cited by examiner

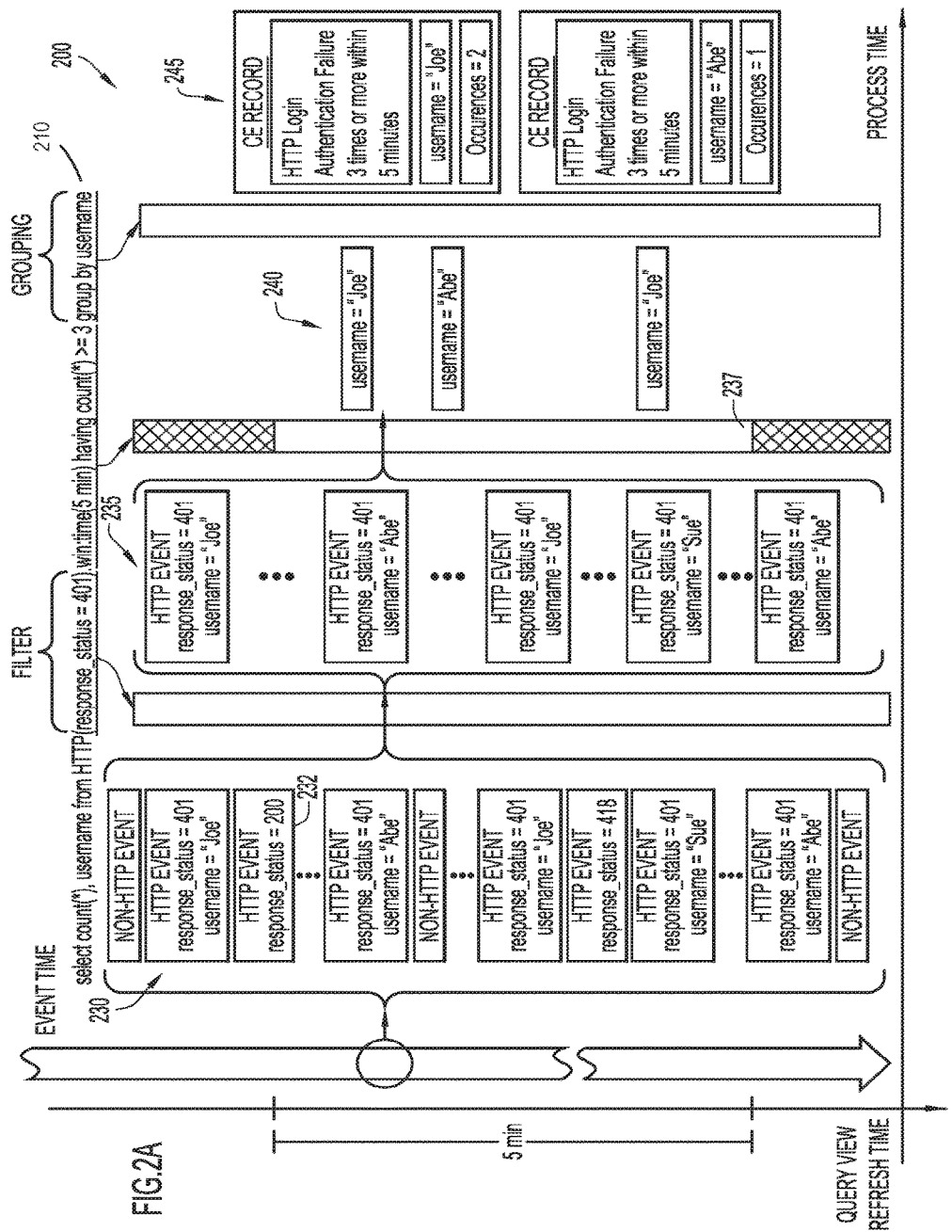

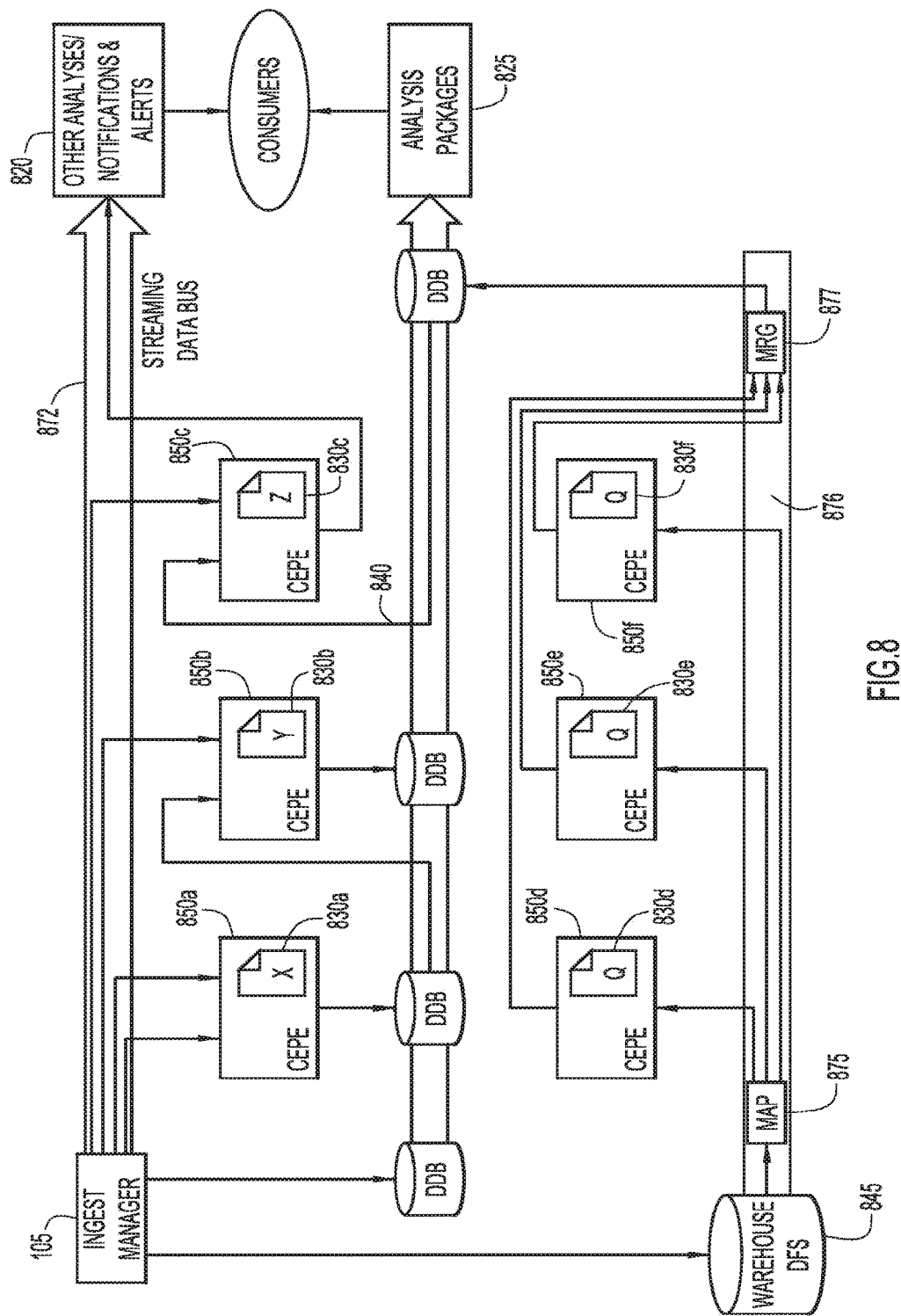

DISTRIBUTED COMPLEX EVENT PROCESSING

RELATED APPLICATION DATA

This application claims priority under 35 U.S.C. § 119(e) from U.S. Provisional Patent Application No. 61/769,177 entitled "Distributed Complex Event Processing," filed Feb. 25, 2013. The disclosure of that provisional patent application is incorporated herein by reference in its entirety.

TECHNICAL FIELD

Embodiments of the present invention relate to parallel complex event processing of event data streams through distributed event processing resources.

BACKGROUND

In recent years, there has been an enormous expansion in the volume of data due to the proliferation of technologies such as social networks, smart meters and sensors, cloud computing and more powerful mobile devices. The term "Big Data" is now widely used to refer to arbitrarily large aggregates of varied, complex and minimally structured data. Analysis of larger data sets can result in information that may not be derivable from smaller sets of data. For example, in a single large set of related data, a larger number of correlations can be found as compared to separate smaller sets with the same total amount of data, where fewer correlations can be found owing to the inherent disjunction of separated data sets. Thus, as the desire to gain enhanced information from Big Data increases, greater design resources are being expended towards developing more rapid data processing.

Complex event processing (CEP), as used herein, refers to techniques by which information from multiple data sources are analyzed to infer meaningful events (such as opportunities or threats), preferably with as little processing delay as possible. Current trends are towards performing CEP on ever-widening event clouds that approach the realm of Big Data. The vast amount of information available about events is often difficult to process with conventional data management, processing and analysis tools. Accordingly, there is a need for complex event processing tools for very large event clouds.

SUMMARY

To identify an occurrence of a complex event by distributed complex event processing, a complex event query specification is constructed in accordance with which a complex event processing engine analyzes an event stream for the complex event. Event data stored in a distributed file system are mapped to respective instances of the complex event processing engine in respective distributed event streams. The distributed event streams are analyzed by the respective instances of the complex event processing engine to which the event data are mapped in accordance with the complex event query specification. The instances of the complex event processing engine execute independently one from another. The occurrence of the complex event in any of the distributed event streams is indicated by the instances of the complex event processing engine.

BRIEF DESCRIPTION OF THE DRAWINGS

FIGS. 2A-2B are diagrams of event stream processing by an example complex event processing engine.

FIG. 8 is a schematic diagram of event data flow across multiple, concurrently executing complex event processing engines embodying the present general inventive concept.

DESCRIPTION OF EXAMPLE EMBODIMENTS

Figure 1:
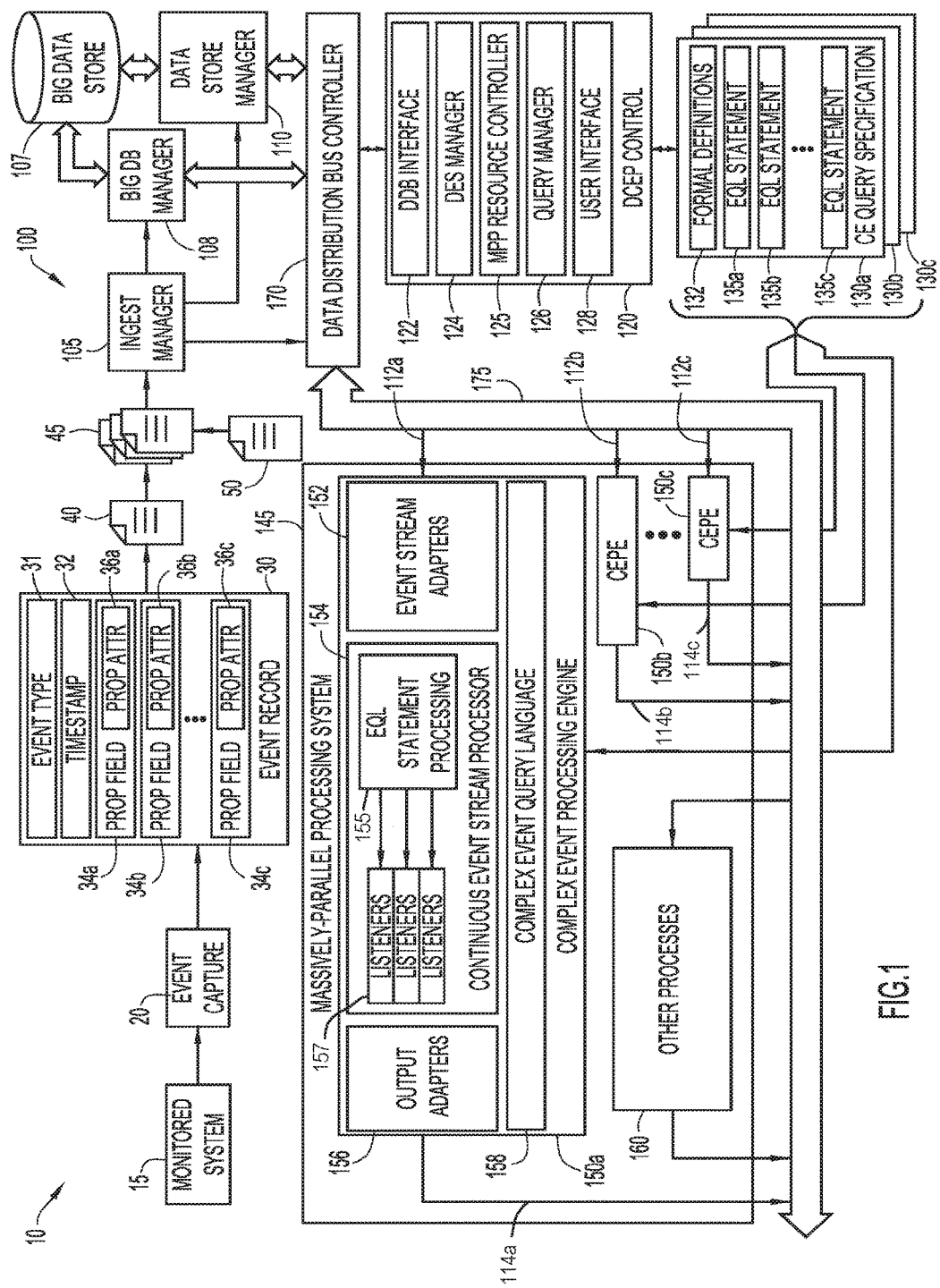
FIG. 1 is a conceptual illustration of basic mechanisms of the present general inventive concept.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and the interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

FIG. 1 is a schematic block diagram of an event driven system (EDS) 10 in which the present invention can be embodied. Exemplary EDS 10 includes a monitored system 15 operating in a context of an ontological domain. Monitored system 15 may include various mechanisms specific to the ontological domain by which data are collected and analyzed. For example, financial markets within a financial ontological domain may be monitored by one or more price quotation systems that electronically deliver market prices of various stocks, commodities, financial instruments, etc. As another example, a network infrastructure of a particular enterprise within a communications network ontological domain may be monitored by network traffic analyzers that deliver metadata describing activity on different layers of a conceptual network model, such as the Open Systems Interconnection (OSI) model. The present invention is not limited to particular systems, monitoring techniques or data types that realize monitored system 15; skilled artisans working within essentially any ontological domain will recognize various monitored systems that can be used in conjunction with embodiments of the present invention without departing from the spirit and intended scope thereof. Moreover, it is to be understood that the present invention can be embodied to perform complex event analysis of data from more than one monitored system 15, including monitored systems across multiple ontological domains.

EDS 10 may include an event capture device 20 that is constructed or otherwise configured to determine whether an event has occurred in monitored system 15. An "event," as used herein, is any occurrence that can be described or otherwise characterized by the shared vocabulary of the ontological domain in which monitored system 15 resides. The various monitoring mechanisms (not illustrated) of monitored system 15 may be communicatively coupled to event capture device 20, which may be configured to compare the data delivered by those monitoring mechanisms against event-defining criteria. When such criteria are met, event capture device 20 may generate an event record 30, which event capture device 20 may incorporate into an event data file 40. Event records 30 contained in other event data files, representatively illustrated by event data file 45 may be provided from other monitored systems (not illustrated). Aggregated event data files from various sources, representatively illustrated by event data files 50, may be conveyed to distributed complex event processor (DCEP) 100, at which the event data files 50 may be accepted by an ingest manager 105. Ingest manager 105 may perform optional preprocessing on event data files 50, such as filtering and/or reformatting, and then selectively route the event data along one or more data paths. For example, data ingest manager 105 may route event data to a database suitable for big data applications, which will be referred to herein as a "big database." To that end, data ingest manager 105 may provide the event data to big database manager 108 where it may be indexed in accordance with suitable schema and then stored accordingly. Certain embodiments may use one of the many NoSQL (for "Not only structured query language (SQL)") implementations as the big database, although the present invention is not so limited. The big database may be stored in a segment or volume of big data store 107, which itself represents an infrastructure constructed or otherwise configured to persistently store, reliably maintain and provide access to arbitrarily large data aggregates.

A user of EDS 10 may elect to store raw event data in big data store 107, such as for purposes of data warehousing. Accordingly, ingest manager 105 may be configurable to route event data to data store manager 110, which may implement mechanisms by which the event data can be stored and retrieved from big data store 107, such as through a suitable distributed file system (DPS). A user may also elect to forego storage of the event data and store only the analysis results. To that end, ingest manager 105 may be configurable to provide the incoming event data directly onto a data distribution bus 175 that, under control of data distribution bus controller 170, provides the event data as event data streams to the appropriate analysis resources. Data distribution bus 175 and data distribution bus controller 170 represent a number of different mechanisms by which event data are routed through EDS 10 for analysis and by which analysis results are returned. In one embodiment, analysis results are suitably indexed and stored in the big database. When so embodied, event data, whether retrieved from big data store 107 or provided directly from ingest manager 105, and big database data may be conveyed to and from analytic resources over data distribution bus 175 under control of data distribution bus controller 170. This feature is discussed in detail with reference to FIG. 2.

Events associated with EDS 10 may be characterized by quantifying information, e.g., numerical value, machine or process state, textual descriptors, etc., assigned to monitored system variables at the time the event occurred. These monitored system variables are referred to herein as "event properties," or simply "properties" and, at any given instance, take on "property attributes," or simply "attributes." Each event type implemented in EDS 10 may be associated with a particular set of properties that are relevant to and sufficiently descriptive of an event of that event type. Exemplary event record 30 contains an event type field 31, the contents of which identify the type or classification of the captured event, such as by an event type name. As stated above, event capture device 20 may compare monitor data delivered by monitored system 15 against certain event-defining criteria. In certain embodiments, the event-defining criteria are associated with respective event types, in which case the data in event type field 31 are indicative of the event-defining criteria that were met. The time at which the event-defining criteria were met may be represented in a timestamp field 32. Event record 30 may include one or more property fields 34a-34c, representatively referred to as property field(s) 34, containing respective property attributes 36a-36c, representatively referred to herein as property attribute(s) 36. In certain embodiments, property attributes 36 are obtained by event capture device 20 at the time the event occurs, i.e., when the event-defining criteria are met, which are then entered into the corresponding property fields 34.

Exemplary DCEP 100 may include a massively-parallel processing (MPP) system 145 on which instances of a complex event processing engine (CEPE) 150a-150n, representatively referred to herein as CEPE(s) 150, and other processes 160 may be executed. One or more complex event queries may be run against distributed event streams 112a-212n, representatively referred to herein as distributed event stream(s) 112, in accordance with one or more complex event query specifications (CEQSs) 130a-130c, representatively referred to herein as CEQS(s) 130. Certain CEPEs 150 may be provided with identical copies of CEQS 130, while other CEPEs 150 may be provided with a unique CEQS 130.

Referring to FIG. 8, there is illustrated a plurality of CEPEs 850a-850f that have been instantiated for various complex event analysis jobs in accordance with the present invention. As is discussed in detail below, CEPEs 850a-850f identify complex events in event streams defined in respective CEQSs 830a-830f. In the scenario illustrated in FIG. 8, each of CEPEs 850a-850c have different CEQSs 830a-830c, respectively, while CEPEs 850d-850f are provided with identical CEQSs 830d-830f, respectively.

Streaming data bus 872 represents mechanisms of data distribution bus 175 by which event data is streamed. In one embodiment, streaming data bus 872 is implemented in accordance with the Advanced Message Queuing Protocol (AMQP) and CEPEs 830a-830c are communicatively coupled to ingest manager 105 in accordance with AMQP. It is to be understood, however, that other data streaming mechanisms can be used in conjunction with the present invention without departing from the spirit and intended scope thereof. CEPE 850a retrieves event data of two separate event streams identified in CEQS 830a from the input data stream on streaming data bus 872. Complex events meeting the criteria of CEQS 830a are output by CEPE 850a and, as one option, are routed to be stored in distributed database 840, such as by data distribution bus controller 170. Distributed database 840 may be a NoSQL implementation of the big database, as described above. CEPE 850b also retrieves event data from streaming data bus 872, but also retrieves event data as another event stream from distributed database 840 and the two event streams are analyzed in accordance with CEQS 830b. The analysis results output by CEPE 850b are also stored in distributed database 840. CEPE 850c analyzes event streams from streaming data bus 872 and from distributed database 840 and its output is provided back to streaming data bus 872 where it can be used by downstream processes that perform, for example, other event stream analyses and/or alerts and notifications. Embodiments of the present invention may be configurable such that all or a part of data on streaming data bus 872 can be directed to a data warehouse and stored in accordance with the warehouse DFS, such as warehouse DFS 845. However, such configurability may include the option to store only specific analysis results and discard the raw event data. The results may be stored in the big database, e.g., distributed database 840, and made available to end consumers through analysis packages 825 as a purchasable product. Additionally, certain embodiments may allow the end consumer to specify the analysis parameters, such as in a CEQS, of which the results can be stored and made available for reuse in other analyses jobs.

Each of CEPEs 850d-850f are provided with copies 830d-830f of the same CEQS to perform complex event processing on event streams retrieved from stored event data. As described in detail below, event data residing in storage 876 in accordance with a DFS, such as warehouse DFS 845, are mapped to specific CEPEs 850d-850f as parallel event streams, such as by a mapping process 875, and the combined outputs of CEPEs 850d-850f form the analysis results specified by the identical CEQSs 830d-830f. The analysis results can be merged by a suitable merging process 877 and, optionally, stored in distributed database 840, where it can be used in subsequent analyses. From the foregoing description, those having skill in the distributed data processing and analysis arts will appreciate the diversity of the distributed complex event processing technique disclosed herein and will recognize numerous query configurations that can be realized in embodiments of the present invention without departing from the spirit and intended scope thereof.

Returning now to FIG. 1, a user of DCEP 100 may construct a CEQS 130 using a complex event query language (CEQL), representatively illustrated at CEQL block 158, that is interpretable by the particular CEPE being used. The information contained in different event records 30, e.g., the different event types and associated properties, the vocabulary of the particular ontological domain, the manner in which event data fields are arranged in the different event records 30, etc., may be required by CEPE 150 to apply CEQS 130 to distributed event streams 112. Accordingly, CEQL 158 may implement mechanisms by which event record details can be entered into CEQS 130, such as through one or more formal definitions 132. In one embodiment, elements of CEQL 158 follow an object-oriented programming (OOP) paradigm and thus allow events to be defined in CEQS 130 as object classes. When so embodied, formal definitions 132 may include class definitions consistent with the OOP paradigm for respective event types that are to be used in the complex event analysis. The class definitions may mimic the structure of event records 30, which is typically known to the user, corresponding to the event types and, accordingly, data contained in the fields of event record 30 can be correctly accessed by identifying the corresponding class member using the syntax rules and operators of the OOP language. Other techniques that incorporate knowledge of the incoming event data format into CEQS 130 can be implemented as well and remain within the intended scope of the present invention.

Exemplary CEQS 130 is constructed from one or more CEQL statements 135a-135c, representatively referred to herein as CEQL statement(s) 135, that together define a complex event in terms of conditions on and relationships between individual events represented in distributed event streams 112. CEQS 130 may also include patterns and correlative conditions that must be met as well for a given complex event. The present invention is not limited to a particular query language by which CEQL 158 may be realized. Certain embodiments implement the Event Processing Language (EPL) associated with the ESPER CEPE, which is an open-source complex event processing framework supported by the Codehaus Foundation.

Basic components of an ESPER CEPE are illustrated at CEPE 150a, and it is to be assumed that the remaining CEPEs 150 are identically configured. Each instance of exemplary CEPE 150 includes event stream adapters 152 and output adapters 156 through which event stream data of various sorts, e.g., file streams, comma-separated values, HTTP formatted data, etc. can be provided to and/or emitted from CEPE 150. In certain configurations, input event data are converted to an internal event representation for further processing or converted from such a format into a selected output format by output adapters 156. The event data are then conveyed to continuous event stream processor 154 by which the bulk of the complex event processing is achieved. CEQL statements 135 may be applied to one or more distributed event streams 112 through CEQL statement processor 155 and when one or more conditions in the statement are met, a state of a corresponding listener 157 is updated. A complex event is reported or otherwise indicated at any of the outputs 114a-114n of CEPEs 150, representatively referred to herein as complex event output(s) 114, when the states across all listeners 157 reflect that the conditions defining the complex event in CEQS 130 are met.

CEQL statements 135 may be processed in CEQL statement processor 155 to define one or more views. Similar to tables in a SQL statement, views define the data available for querying and filtering. Some views, referred to herein as "query views," represent windows over a stream of events. Other query views derive statistics from event properties, group events or handle unique event property values. Query views can be staggered onto each other to build a chain of query views.

Referring to FIG. 2A, an example complex event analysis process 200 is illustrated for exemplary CEQS 210 and will now be described to explain certain concepts. CEQS 210 defines the complex event as an occurrence of three (3) failed login attempts by any user within a five (5) minute interval. It is to be assumed that an event class "HTTP" (for Hypertext Transfer Protocol) has been declared for CEQS 210, that the event class HTTP has at least properties "username" and "response_status" and that event records 30 generated in response to HTTP authentication events contain property fields 34 that correspond to the member variables of the declared HTTP class. Those skilled in HTTP will recognize status code 401 as that returned when an authentication attempt has failed.

Additionally, it is to be assumed in this example that process 200 is executed by a CEPE 150 on an event stream 230. It is to be assumed as well that event stream 230 comprises event data, representatively illustrated at event data block 232 that are linearly-ordered by advancing time, with earlier-captured event data entering CEPE 150 before later-captured event data. In certain embodiments, timestamps 32 may be carried in event data 232, but have been omitted in FIG. 2A to avoid congesting the figure. Events 232 may enter process 200 at a selected input rate that is independent of event time, i.e., that indicated by timestamps 32, and is generally limited only by the underlying hardware. As new events enter process 200, a new query view is established and, accordingly, the event stream input rate is referred to herein as the "query view refresh rate." The query view extends across all event data that are to be included in an evaluation that determines the updated state of a corresponding listener 157. Were it not for processing and/or storage limitations, a query view on a continuous event stream could continue to grow indefinitely. In the example of FIG. 2A, however, the query view is limited by a five-minute window.

In accordance with CEQS 210, only HTTP events contained in event stream 230 are to be considered and, among those, only HTTP events of "Unauthorized" login (HTTP response code 401) are to be considered. The former restriction is imposed by the "select" query command and the latter is imposed by a filter clause; the net restriction realizes a new query view 235. It is to be noted that query view 235 is updated at the same query view refresh rate at which query view 230, i.e., the raw input stream, is updated. The five-minute window, representatively illustrated by window 237, is defined on query view 235 to create another query view 240 that is also updated at the query view refresh rate. Analogously to a sliding window, one event 232 exits window 237 at the query view refresh rate concurrently with another event 232 entering window 237. The complex event is indicated when three or more events 232 having the same username attribute are present in query view 245 in any update interval. For simplicity, such groups of three or more are illustrated in FIG. 2A as representative blocks for a group of events. Finally, in accordance with CEQS 210, occurrences of the complex event are grouped together by username and occurrences for each group are reported together, as is illustrated at process output 245.

Figure 2B:
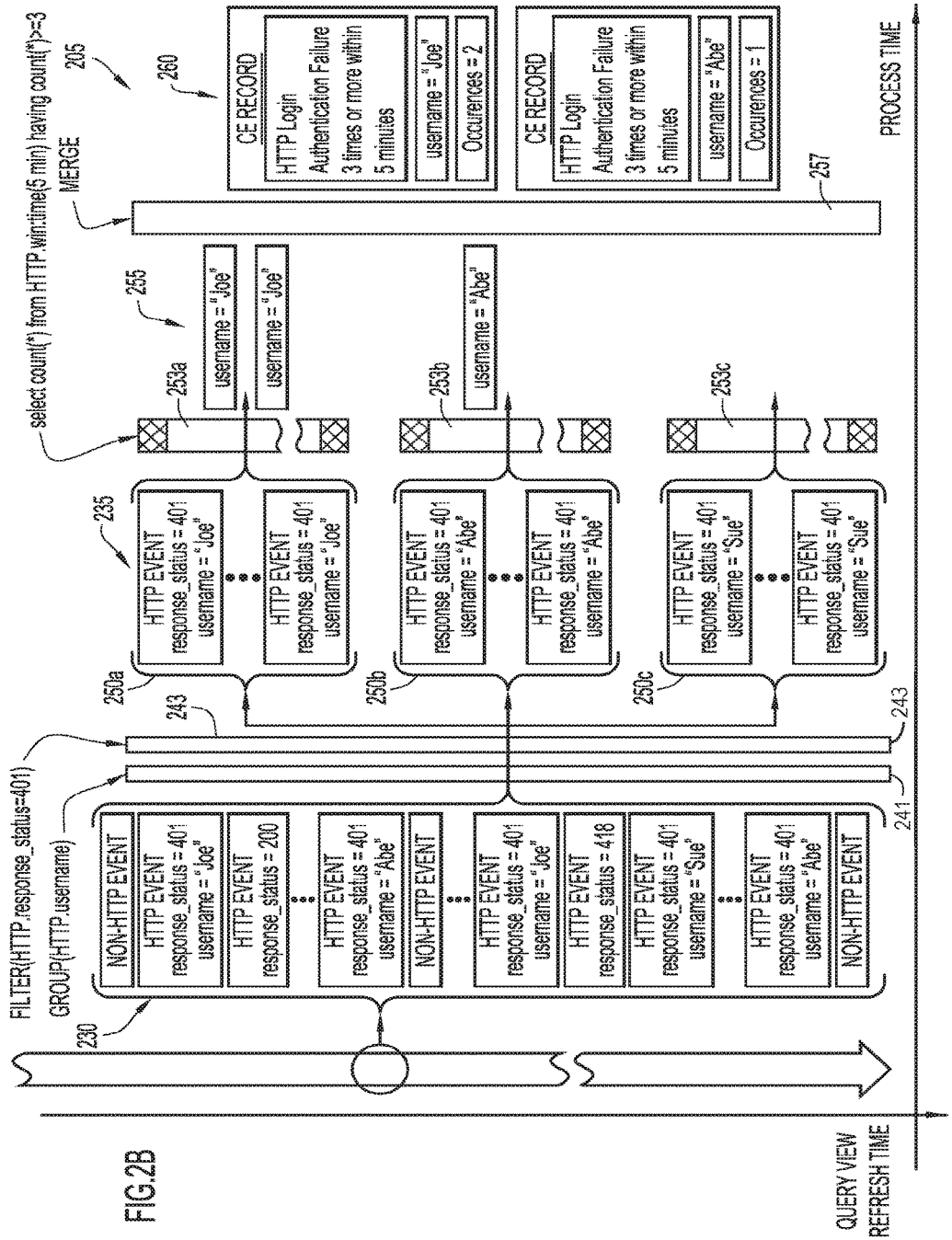

Referring now to FIG. 2B, there is illustrated a distributed complex analysis process 205 that may be implemented by embodiments of the invention, such as by CEPEs 850*d*-850*f* in the scenario of FIG. 8. For purposes of comparison with process 200, event stream 230 is used as the event data source. In process 205, the grouping and filtering operations, representatively illustrated at grouping block 241 and filtering block 243, are performed prior to providing the event data to CEPEs 150. The grouped and filtered event data are provided in parallel to independently executing CEPEs 150 as distributed event streams 250*a*-250*c*, representatively referred to herein as event stream(s) 250. Each CEPE 150 defines an identical five-minute window 253*a*-253*c*, representatively referred to herein as window(s) 253, on the query view formed by the corresponding event stream 250 at the inputs of CEPEs 150, which are all updated at the query view refresh rate. Thus, the same sliding window mechanism described for process 200 in FIG. 2A is implemented on each CEPE 150 for process 205. The outputs of CEPE 150 are the complex events illustrated in output stage 255 which correspond to complex event outputs 114 in FIG. 1. As an optional configuration for DCEP 100, complex event outputs 114 can be coupled to a merging process, representatively illustrated at merge block 257, to combine occurrences of the complex events for each group into a reporting format, illustrated at merged output stage 260, similar to that performed by process 200.

Various benefits and advantages of the present invention are made apparent in a comparison of distributed complex event analysis process 205 against complex event analysis process 200. There is of course the advantage of dramatically increased throughput achieved by the parallel processing. More subtle is the impact of reduced load on each CEPE 150 realized by partitioning the input event data 230 into distributed event streams 250, let alone by filtering the input event data 230 of event data 232 that are irrelevant to the query. As indicated above, the query view could extend indefinitely if the physical constraints that unavoidably prevent such from occurring could somehow be circumvented. Barring such mechanism, the physical constraints, most notably the amount of memory required to store such an extensive query view, impose an operational boundary on computational resources that can be reached quite rapidly. Reduction of input data density at a CEPE 150 is a natural consequence of data parallelization and leads to increased margins on computational resources system-wide. Of course, filtering irrelevant event data from the distributed event streams extends those margins even further.

Occurrences of a complex event defined by a CEQS 130 and identified by a single CEPE 150 carrying out the CEQS 130 on one or more event streams encompassing a given volume of event data should not be missed or otherwise not identified by DCEP 100 carrying out an equivalent CEQS 130 on distributed event streams 112 encompassing the same event data. As noted in FIGS. 2A-2B, the complex events at output stage 255 of distributed complex event analysis process 205 are identical to those in query view 240 of complex analysis process 200. Accordingly, one aspect of the present invention is to ensure that such is always the case.

Referring once again to FIG. 1, exemplary DCEP 100 includes a DCEP controller 120 to manage and coordinate the various processes and data flows through which distributed complex event processing is realized by embodiments of the present invention. A user interface 128 may be provided through which a user can interact with DCEP 100 through such activities as establishing analysis parameters including those by which CEQS 130 is constructed, and invoking and operating various software tools, such as for visualizing and further analyzing identified complex events, as well as activities not directly related to complex event processing, such as system maintenance and archiving. Query manager 126 may implement overarching control functionality by which complex event queries are conducted, including, but not limited to, the mechanisms by which the aforementioned parameters, e.g., CEQS 130 are established, modified and stored, the mechanisms by which the aforementioned software tools perform their various functions in accordance with user input provided through user interface 128, instantiating, initializing and terminating complex event processing jobs as well as monitoring the progress of any currently executing complex event analysis processes and taking appropriate action as needed or otherwise specified. MPP resource controller 125 may implement mechanisms by which computational resources of MPP system 145 are dynamically allocated and unallocated for purposes of executing various processes, and may implement mechanisms by which such processes are instantiated and terminated, such as in response to control messages or signals designed for such purpose. Distributed event stream manager 124 may provide the functionality by which distributed event streams 112 are populated, i.e., by which event data are assigned to respective target CEPEs 150 and provided thereto as constituents of respective event streams 112, in accordance with event data distribution criteria. Distributed data bus interface 122 may implement mechanisms by which DCEP controller 120 selects event data sources for provided event data onto distributed data bus 175. It is to be understood that while DCEP controller 120 is illustrated and described as being centralized and as being realized through separate functional components having distinct operational assignments, such is solely for purposes of description. The functionality of DCEP 120 may be distributed across DCEP 100 and may cross operational boundaries of both hardware and software. Indeed, certain operational aspects of DCEP controller 120 may be achieved by commercially-available and/or open-source software components that interoperate with or already exist as a component of one or more frameworks supporting a DCEP implementation, such as the warehouse DFS and/or ESPER. Numerous variations of DCEP controller 120 as well as modifications to the functionality thereof described herein may become apparent to the skilled artisan upon review of this disclosure and may be used in conjunction with the present invention without departing from the spirit and intended scope thereof.

From a broad perspective, a complex event query job may be performed by DCEP 100 in the following manner, the description of which is intended solely for elucidation and not limitation. A user may construct CEQS 130 by interacting with query manager 126 through user interface 128. Once a user has established CEQS 130, a complex event query job based on CEQS 130 may be initiated. For example, from CEQS 130, MPP resource controller 125 can determine the number of distributed event streams 112 that may be generated from the event stream grouping criteria and may instantiate a corresponding number of CEPEs 150 on MPP system 145. Such instantiation may include providing a copy of CEQS 130 to each CEPE 150. Distributed event stream manager 124 may then retrieve event records from data store 107, analyze the event records against the grouping and filtering criteria and either convey the event record to a particular CEPE 150 as a constituent of a corresponding distributed event stream 112 or exclude inclusion of the event record if the event record does not meet all of the filtering criteria. The distributed event streams 112 may be analyzed by the respective CEPEs 150 and occurrences of the complex event may be output or otherwise indicated on complex event outputs 114.

Figure 3:
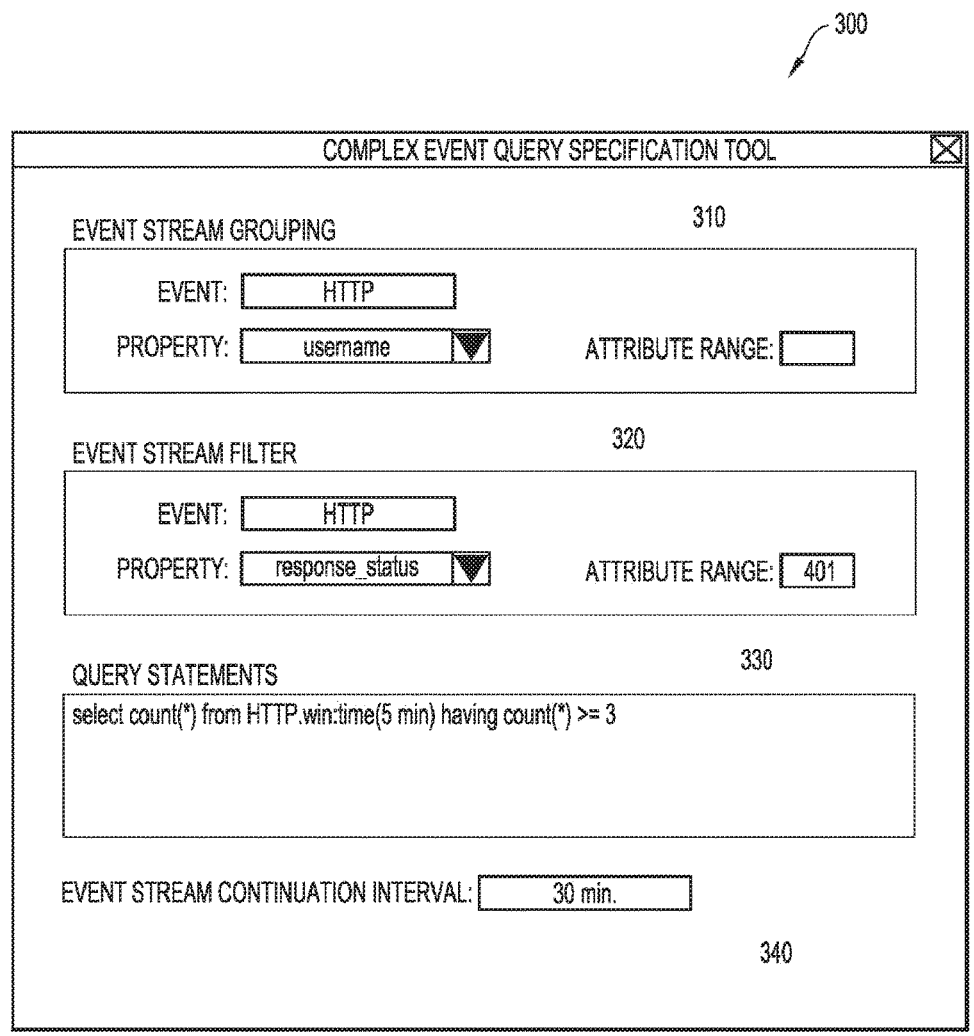
FIG. 3 is a diagram of an example user interface through which complex event query specifications may be constructed.

FIG. 3 is an illustration of an exemplary CEQS user interface 300 that may be presented to the user on a display component (not illustrated) of user interface 128. As illustrated in the figure, exemplary CEQS user interface 300 includes event stream grouping controls 310 for defining criteria by which event data are grouped into distributed event streams 112, event stream filter controls 320 by which relevant events can be specified, query statements control 330 by which additional complex event defining criteria can be entered and event stream continuation interval control 340 by which the rate is specified at which incoming event data are collected prior to being transferred to CEPEs 150 in distributed event streams 112. CEQS user interface 300 illustrated in FIG. 3 is merely an example of an interface through which a user may specify what event processing to be performed external to CEPEs 150, e.g., event grouping and event stream filtering, and what event stream processing is performed by CEPEs 150, e.g., query statements. It is to be understood CEQS user interface 300 may include controls other than those illustrated that allow the user to set various parameters and options for performing a complex event processing session.

As is illustrated in FIG. 3, CEQS user interface 300 allows the user to configure event grouping and filtering separately from other conditions defining the complex event of interest. Accordingly, grouping and filtering can be performed externally to CEPE 150 thereby decreasing the input query view and reducing the resources required to perform the complex event analysis.

Figure 4A:
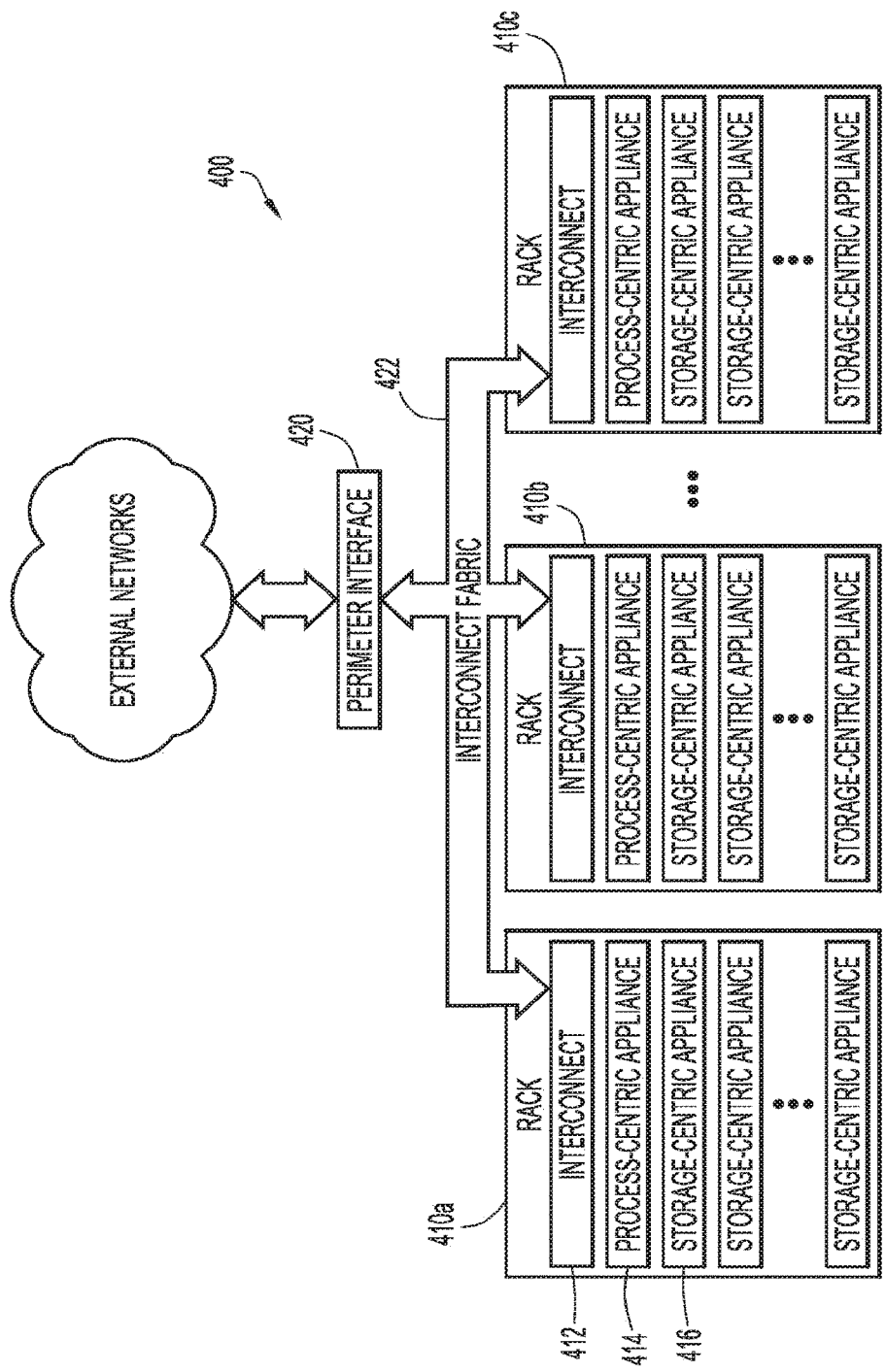
FIGS. 4A-4B are schematic block diagrams of an example data warehouse in which the present general inventive concept might be embodied.
Figure 4B:
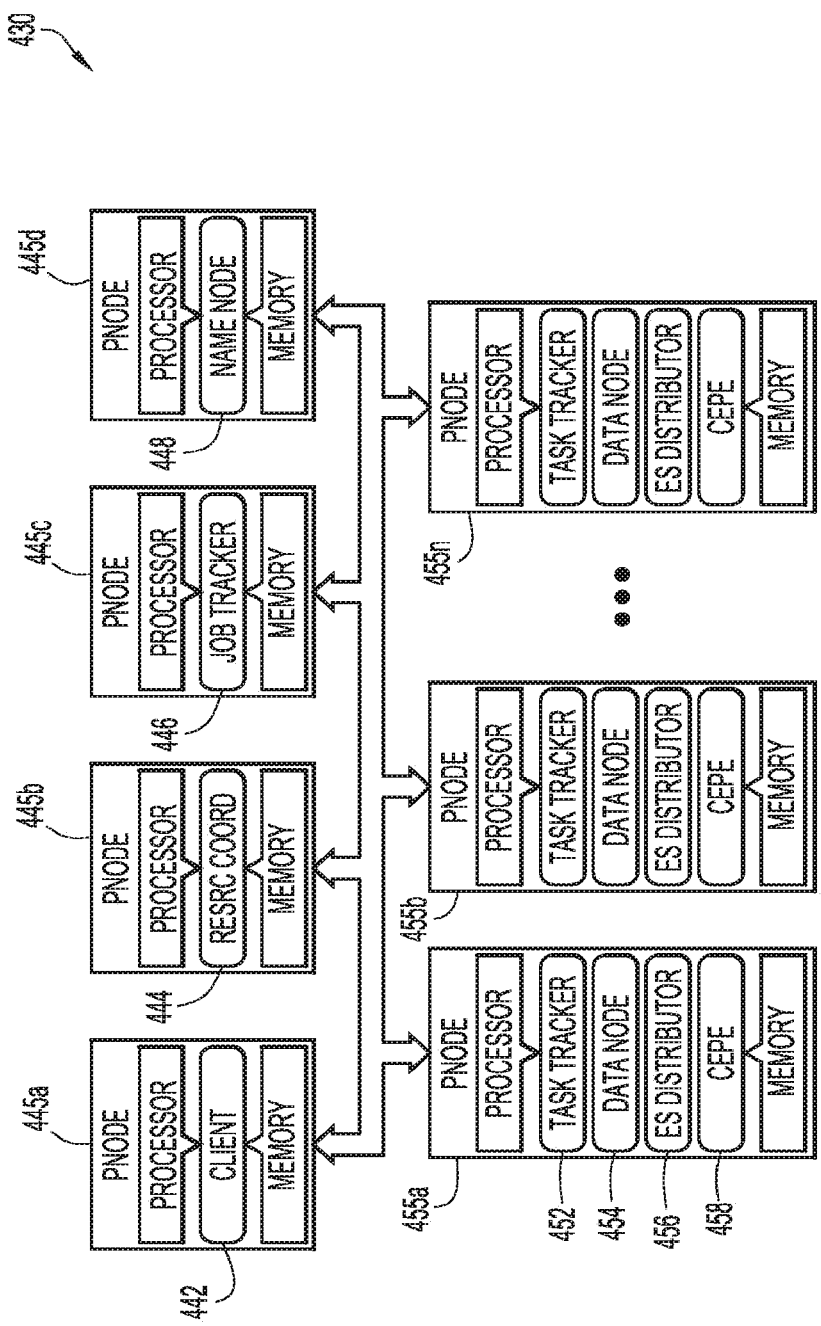

FIGS. 4A-4B, collectively referred to herein as FIG. 4, illustrates an exemplary system in which the present invention can be embodied. FIG. 4A is a schematic block diagram of a data warehouse 400 communicatively coupled to external networks through suitable perimeter interface equipment 420. Data warehouse 400 may include a plurality of equipment racks 410a-410c, representatively referred to herein as equipment rack(s) 410, each containing interconnect equipment 412, zero or more process-centric appliances 414 and one or more storage-centric appliances 416. As used herein, a process-centric appliance 412 is a network appliance that may have greater processing capabilities than a storage-centric appliance 414, which may have larger storage capacity than a process-centric appliance 412. Storage-centric appliances 416 may be implemented through inexpensive commodity processors, whereas process-centric appliances 414 may have processors with greater capabilities. Equipment racks 410 and the appliances within equipment racks 410 may be interconnected by a suitable interconnect fabric 422 through which data and control signals are conveyed. The number of process-centric appliances 414 and storage-centric appliances 416 as well as the interconnect fabric 422 will vary by application and those having skill in the data warehousing art will recognize numerous configurations suitable for carrying out the present invention upon review of this disclosure.

FIG. 4B is a schematic block diagram of a processing and storage framework 430 that may be implemented in data warehouse 400. Processing and storage framework 430 comprises a plurality of interconnected processing nodes; master processing nodes 445a-445d, representatively referred to herein as master processing node(s) 445, may be implemented by processors and memory of process-centric appliances 414 and slave processing nodes 455a-455n, representatively referred to herein as slave processing node(s) 455, may be implemented by processors and memory of storage-centric appliances 416. In certain embodiments, framework 430 is implemented in HADOOP, which is an open-source project of the Apache Software Foundation, with complex event processing realized by ESPER and additional mechanisms through which HADOOP and ESPER can interoperate. When so embodied, master processing nodes 445 may execute a client process 442 to provide the application interface, e.g., the various complex event analysis tools, to the HADOOP framework, a resource coordinator process 444 such as ZOOKEEPER (also supported by the Apache Software Foundation) to coordinate the use of HADOOP resources, a job tracker process 446 through which HADOOP MR jobs are submitted and monitored, and a name node 448 through which transactions on the HADOOP distributed file system (HDFS) are controlled and recorded. Slave processing nodes 455 may execute, under control of master nodes 455, a task tracker process 452 by which individual MR jobs are monitored and through which job progress is reported to job tracker 446, a data node process 454 through which HDFS transactions are performed at individual processing nodes, an event stream distributor process 456 by which event data are provided from HDFS to ESPER instances, illustrated at CEPE instance 458, in distributed event streams.

Figure 5:
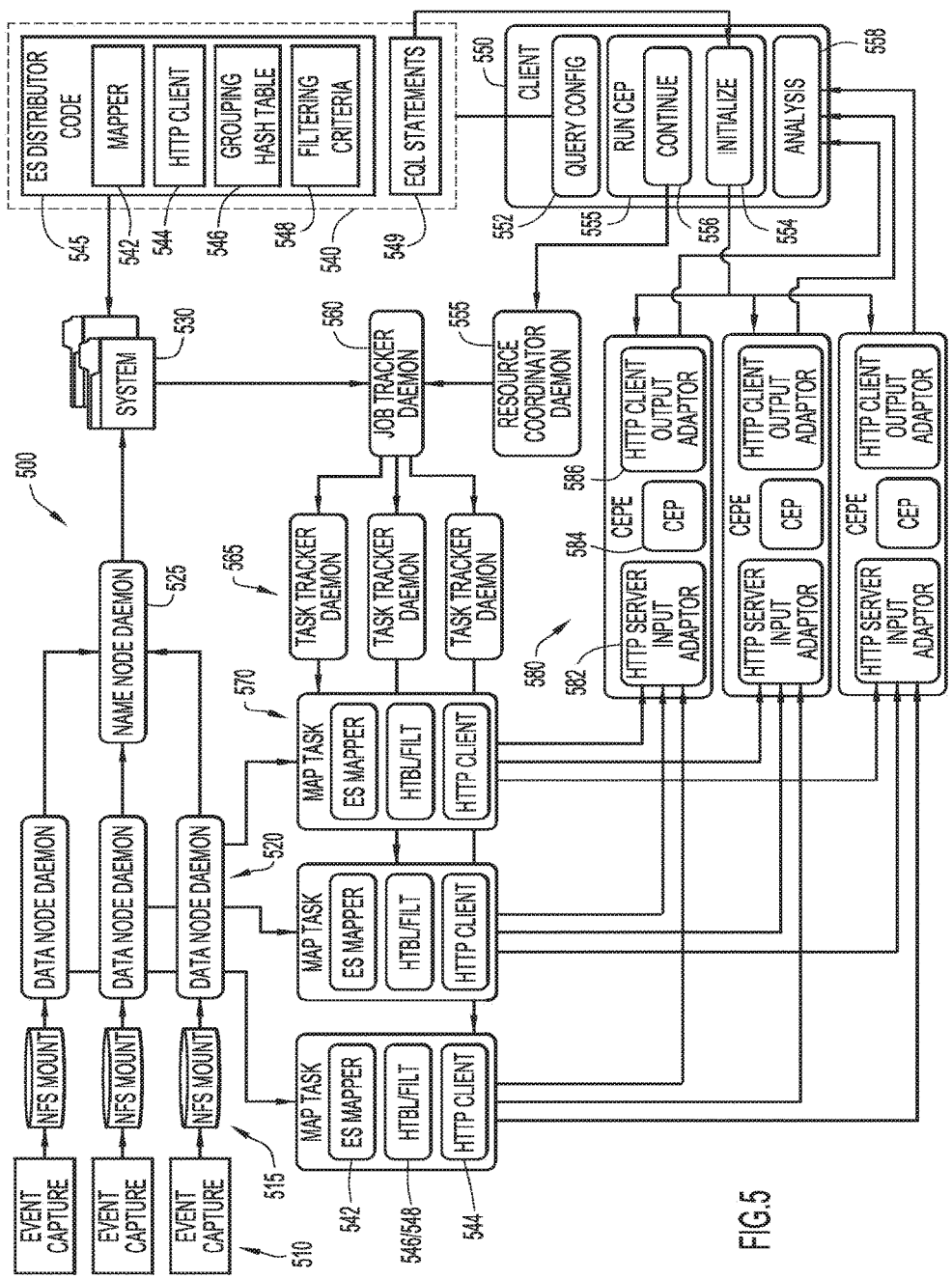
FIG. 5 is a conceptual flow diagram of a complex event query by which the present general inventive concept might be embodied.

FIG. 5 is a conceptual flow diagram of an exemplary distributed complex event processing job that may be performed on the data warehouse infrastructure illustrated in FIG. 4. Client 550 may include a query configuration process 552 through which a user can establish analysis parameters including a complex event query specification, as described above. Query configuration process 552 may generate a configuration file 540 to include, for example, CEQL statements 549 and event stream distributor code package 545. Event stream distributor code package 545 may include the code and configuration parameters by which event data are assigned to different distributed event streams and provided to corresponding CEPE instances 580. Mapper code 542 may include executable code that implements the mapping process, as described below. HTTP client code 544 may include executable code that performs event data transport between processing nodes, e.g., slave processing nodes 455. Grouping hash table 546 may contain event stream/CEPE associations as key/value pairs and filtering criteria 548 may include the specification of relevant event data for purposes of data filtering. As illustrated in FIG. 5, configuration file 540 may be stored in a system directory 530 at a location designated for MR jobs.

As stated above, grouping criteria establishes the manner in which event data are assigned to distributed event streams. Such grouping should ensure that all occurrences of a complex event that would be identified by a single CEPE instance operating on a single event stream are also identified by independently executing CEPE instances operating in parallel on distributed event streams encompassing the same event data as the single event stream. One technique to meet this requirement is to compute and store hash values for all attributes of an event property that is chosen for grouping, such as by the event stream grouping controls 310 illustrated in FIG. 3. For example, if the event property "username" is selected for grouping, a hashing function may be applied to each of the attributes for the property "username." Thus, the hashing function applied to username "Joe" will have one value, "Abe" will have another value, and so on. The computed hash values may be stored as keys in a hash table and each key may be associated in the hash table with an identifier of a particular distributed event stream. As event records are retrieved from the distributed file system, the attribute of the selected property is hashed with the hash function, and the corresponding distributed event stream identifier may be retrieved from the hash table. Each distributed event stream may be associated with a particular CEPE instance and, accordingly, all of the event data having a given property attribute, e.g., "username=Joe" will be directed to the same CEPE instance. As illustrated in FIG. 2, such technique ensures that no complex event is missed by way of the distributed complex event processing.

Upon demand by the user, client 550 may execute a Run CEP process 555, which may first initialize a set of CEPEs 580. In certain embodiments, each slave processing node 455 contains CEPE code that can be executed on a storage-specific appliance 446 in data warehouse 400. CEPE instances 580 may be activated on specific slave nodes 455 to correspond with the event stream grouping criteria such that specific event data is provided to the same CEPE instance 580 over the query lifetime. Accordingly, client 550 may identify the slave nodes 455 on which to instantiate CEPEs 580 from the selected grouping criteria and the grouping hash table 546. Additionally, each CEPE 580 may be configured in the initialization process with specific input and output adapters 582 and 586, respectively. In the example of FIG. 5, input adapter 582 is configured as an HTTP server input adapter and output adapter 586 is configured as an HTTP client output adapter. Accordingly, event data may be provided to the input of each CEPE 580 in the form of an HTTP service request, extracted by the input adapter 582 and reformatted into an internal CEPE event format and processed by complex event processor 584 to determine the presence of complex events. The occurrences of complex events discovered by complex event processor 584 may be converted to an HTTP service request by HTTP output adapter 586 and provided to an analysis process 558 in client 550.

As illustrated in FIG. 5, event capture devices 510 may have write permissions to HDFS through respective Network File System (NFS) volume mounts 515. Data written into HDFS from the NFS mounts are tracked by HADOOP data node daemons 520 and reported to HADOOP name node daemon 525. Name node daemon 525 stores the location of the incoming data in transaction logs in a HADOOP system directory 530.

CEPEs 580 may be constructed to accept a continuous stream of event data, whereas HADOOP implements a batch Map/Reduce (MR) processing mechanism that is not congruent with continuous stream processing. Accordingly, embodiments of the present invention may implement an event stream continuation process that, at predetermined intervals, retrieves and processes the most recently written event records. For example, at thirty minute intervals, client 550 may issue a continue command 556 to resource coordinator daemon 555, e.g., ZOOKEEPER, which, in turn, initiates a HADOOP map job that executes the event stream distributor code 545. Job tracker daemon 560 may determine from the name node transaction logs in system directory 530 the processing nodes at which the new event data are written. Job tracker daemon 560 may instantiate map tasks 570 through task tracker daemons 565 executing on those processing nodes, where each map task 570 executes an instance of an event stream mapper 542 and an instance of HTTP client 544 along with hash table and filter criteria data 546 and 548, respectively. Each map task 570 may retrieve event records stored at its corresponding processing node, hash the attribute of the selected grouping property and assign the event data to a corresponding event stream if the event record meets the filtering criteria. In one embodiment, HTTP client 544 identifies the target CEPE instance 580 from the event stream identifier in hash table 546 and formats a suitable HTTP service request directed to the HTTP server of a particular CEPE instance 580 to which the corresponding distributed event stream is assigned. In certain embodiments, each of the network appliances in data warehouse 400 are configured with a transmission control protocol (TCP) port specifically designated for distributed event stream traffic. Accordingly, the HTTP service request may be conveyed to the TCP port of the network appliance on which the particular CEPE instance 580 is executing.

The map tasks 570 continue to map data to respective CEPE instances 580 until there are no more event data to be mapped for the current event stream continuation interval. When such occurs, the condition is reported by task tracker daemons 565 to job tracker daemon 560 which terminates the map jobs. The foregoing process is repeated every event stream continuation interval until the query is terminated.

Figure 6:
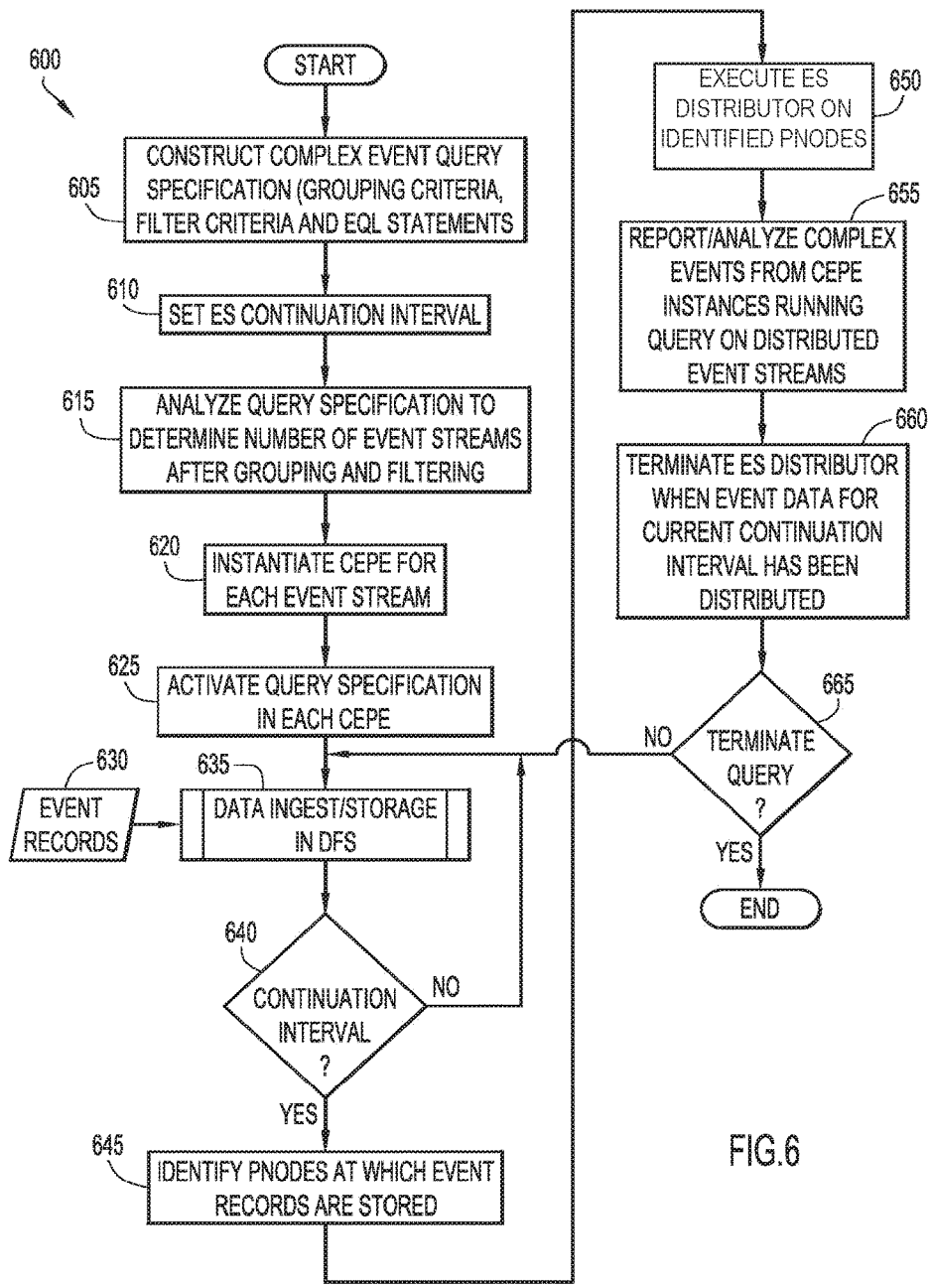
FIG. 6 is a flow diagram of an exemplary distributed complex analysis process by which the present general inventive concept might be embodied.

FIG. 6 is a flow diagram of an exemplary distributed complex analysis process 600 by which the present invention can be embodied. In operation 605, a complex event query specification may be constructed to include configuration parameters, e.g., grouping and filtering criteria, for operations executed externally to CEPEs. In operation 610, a user may establish an event stream configuration interval at which new data are mapped to respective CEPEs. In operation 615, the complex event query specification may be analyzed to determine the number of distributed event streams that can be generated based on the grouping and filtering criteria and in operation 620, the same number of CEPEs are instantiated on specified processing nodes. In operation 625, the complex event query specification is activated in each instantiated CEPE to begin the query process. As a tandem operation to process 600, event records 630 are ingested and stored in the distributed file system, as illustrated in block 635. In operation 640, it is determined whether a new event stream continuation interval has arrived and, if not, process 600 waits at operation 640 while more event data are ingested and stored in the distributed file system. If a new continuation has arrived as determined in operation 640, the processing nodes at which the new event data are stored are identified in operation 645. In operation 650, an event stream distributor is executed on each processing node identified in operation 645, which will be described with reference to FIGS. 7A-7B. In operation 655, the distributed event streams mapped to each CEPE by the event streams distributors are analyzed by the CEPEs and occurrences of the complex event are reported or otherwise indicated. In operation 660, the map jobs running the event stream distributors are terminated once all the event data that was collected during the event stream continuation interval have been distributed. In operation 665, it is determined whether the user wants to terminate the query and, if not, process 600 waits at block 640 until a new event stream continuation interval has arrived.

Figure 7A:
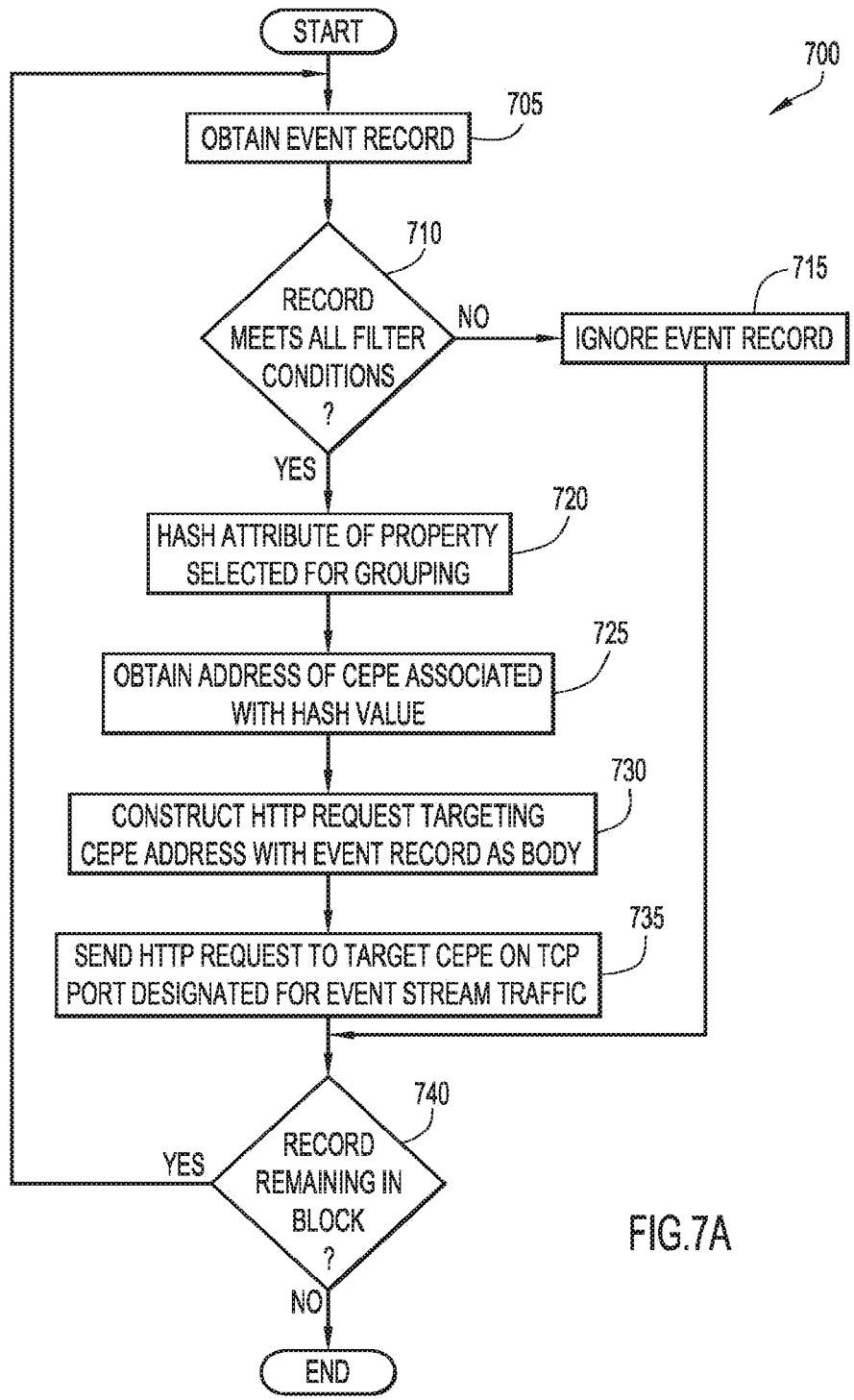
FIGS. 7A-7B are flow diagrams of an exemplary event stream distributor process executing on processing nodes sending event data and an exemplary adaptor process executing on processing nodes receiving the event data.
Figure 7B:
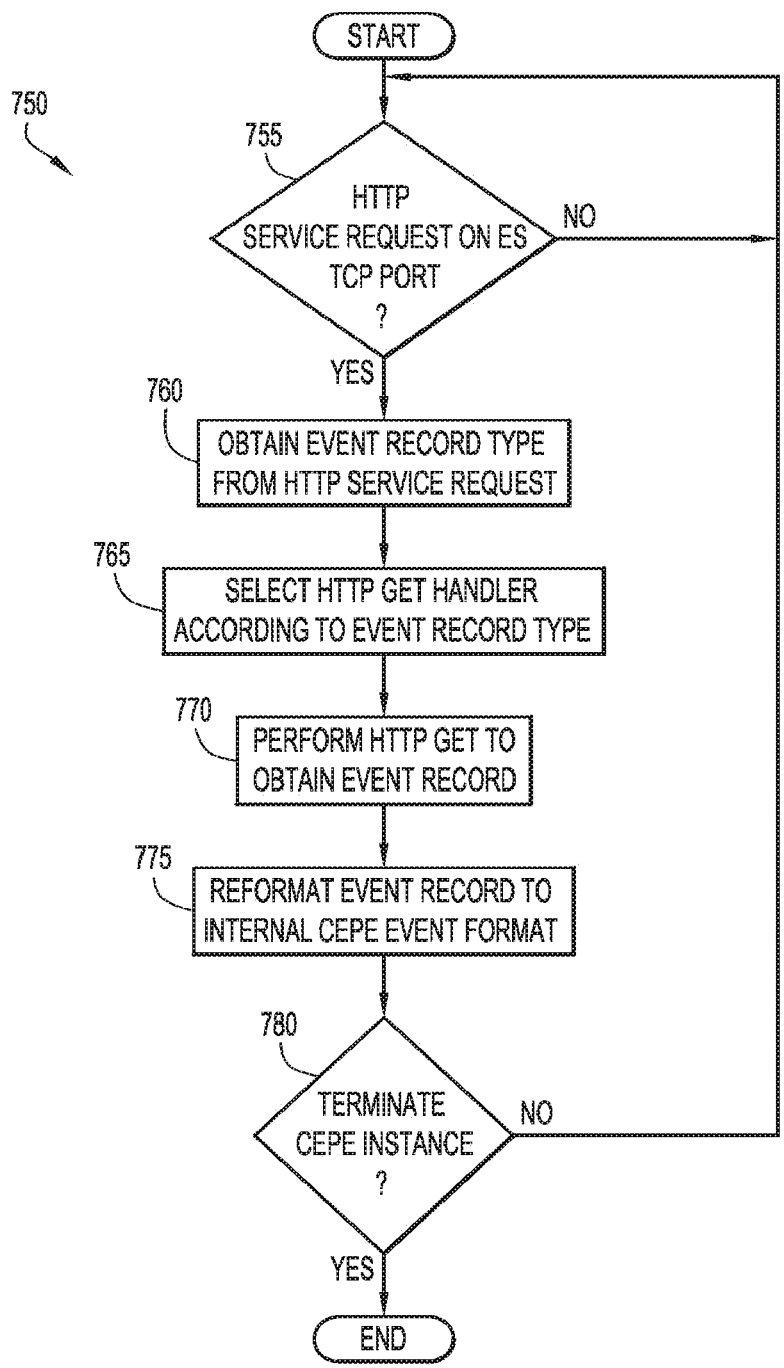

FIGS. 7A-7B, collectively referred to herein as FIG. 7, are flow diagrams illustrating distribution of event data into distributed event streams by way of an exemplary event stream distributor process 700 executing on processing nodes sending event data and an exemplary CEPE adaptor process 750 executing on processing nodes receiving the event data. In operation 705 of FIG. 7A, an event record is obtained from the distributed file system and, in operation 710, the event record is compared to the filtering criteria. If all of the filtering criteria are not met, i.e., the event record represents an event that is not relevant to the query, process 700 transitions to operation 715 and the event record is ignored. If all of the filtering criteria are met in operation 710, process 700 transitions to operation 720 by which the attribute of the property selected for grouping is hashed by a suitable hashing process. In operation 725, the address of the CEPE for the event data group is obtained such as from a hash table. In operation 730, an HTTP request may be constructed for the target CEPE and may contain the event record in the request message body. In operation 735, the HTTP request is sent to the target CEPE on a TCP port of the storage-centric appliance on which the CEPE is executing. In operation 740, it is determined whether event records remain to be distributed and, if so, process 700 returns to operation 705.

Process 750 illustrated in FIG. 7B may be executing at the input adapter of each CEPE. In operation 755, an HTTP service operation in the input adapter determines whether there is an HTTP service request on the aforementioned TCP port and process 750 waits until such is the case. When a HTTP service request has arrived on the TCP port, as determined in operation 755, the event record type is obtained from the HTTP service request body in operation 760. In operation 765, the input adapter may select an HTTP GET handler for the event record type and in operation 770, the input adapter may perform an HTTP GET operation to obtain the event record from the HTTP service. In operation 775, the event record may be reformatted into an event data format internally used by the CEPE and in operation 780, it is determined whether the CEPE instance is to be terminated. If the instance is to continue to execute, process 750 returns to operation 755.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method comprising:
constructing at least one complex event query specification comprising one or more grouping criteria by which event data is grouped into distributed event streams, one or more filtering criteria by which individual events relevant to a given complex event are specified and one or more query statements specifying event stream processing to be performed by complex event processing engines;
establishing a time interval defining an event stream continuation interval for mapping the distributed event streams to complex event processing engines;
analyzing said at least one complex event query specification to determine a given number of different complex event processing engines and corresponding distributed event streams based on the grouping criteria in said at least one complex event query specification;
instantiating the given number of complex event processing engines;

activating said at least one complex event query specification in the complex event processing engines; and responsive to determining that a new event stream continuation interval has arrived based on the established time interval:

identifying new event data stored in a distributed file system relevant to said at least one complex event query specification, wherein relevance is determined based on the one or more filtering criteria in said at least one complex event query specification; and mapping the new event data to respective ones of the complex event processing engines via the distributed event streams, wherein the complex event processing engines evaluates the one or more query statements of said at least one complex event query specification for the event data in the distributed event streams;

wherein the method is performed by at least one processing device comprising a processor coupled to a memory, the at least one processing device comprising one or more master processing nodes and one or more slave processing nodes, the complex event processing engines being instantiated on respective ones of the slave processing nodes, the slave processing nodes executing under control of the master processing nodes;

wherein the master processing nodes are configured to implement an application interface for constructing the at least one complex event processing query, to coordinate use of compute and storage resources by the complex event processing engines, to track one or more complex event processing jobs performed by the complex event processing engines, and to control and record transactions of the complex event processing jobs in a distributed file system;

wherein a given one of the slave processing nodes is configured to monitor one or more of the complex event processing jobs, to report job progress for the one or more complex event processing jobs to the master processing nodes, to perform file system transactions for one or more of the complex event processing jobs in the distributed file system, and to provide event data from the distributed file system to a given one of the complex event processing engines;

wherein said at least one complex event query specification comprises two or more complex event query specifications;

wherein a first one of the complex event processing engines and at least a second one of the complex event processing engines are activated with a same one of the two or more complex event query specifications; and wherein a third one of the complex event processing engines and at least a fourth one of the complex event processing engines are activated with different ones of the two or more complex event query specifications.

2. The method of claim 1 wherein the one or more query statements of said at least one complex event query specification comprise one or more complex event query language statements that together define a complex event in terms of conditions on and relationships between individual events represented in one or more of the distributed event streams.

3. The method of claim 2 wherein the complex event query language utilizes an object-oriented programming paradigm where events are defined as object classes.

4. The method of claim 1 wherein the master processing nodes and the slave processing nodes are part of a data warehouse comprising a plurality of equipment racks, each equipment rack comprising interconnect equipment and at least one of a process-centric appliance and a storage-centric appliance, the process-centric appliances comprising greater processing capabilities than the storage-centric appliances and the storage-centric appliances comprising larger storage capacity than the process-centric appliances.

5. The method of claim 4 wherein the master processing nodes are implemented by one or more of the process-centric appliances and the slave processing nodes are implemented by one or more of the storage-centric appliances.

6. The method of claim 1 wherein identifying the new event data stored in the distributed file system relevant to said at least one complex event query specification comprises:

obtaining an event record from the distributed file system; and determining whether the obtained event record meets filter conditions specified in the one or more filtering criteria of said at least one complex event query specification.

7. The method of claim 6 wherein mapping the new event data comprises, responsive to determining that the obtained event record meets filter conditions specified in the one or more filtering criteria of said at least one complex event query specification:

hashing one or more attributes of the obtained record to obtain a hash value, the one or more attributes being selected based on the one or more grouping criteria of said at least one complex event query specification;

matching the hash value with a given one of the complex event processing engines; and providing the obtained record to the given complex event processing engine via its associated distributed event stream.

8. The method of claim 7 wherein providing the obtained record to the given complex event processing engine comprises:

obtaining an address of the given complex event processing engine associated with the hash value;

constructing a hypertext transfer protocol (HTTP) request targeting the address of the given complex event processing engine, wherein a body of the HTTP request comprise the obtained event record; and sending the HTTP request to the given complex event processing engine on a transmission control protocol (TCP) port designated by the given complex event processing engine for event stream traffic of its associated distributed event stream.

9. The method of claim 8 wherein the given complex event processing engine is configured:

to obtain the HTTP request via an input adapter listening on the TCP port designated for event stream traffic;

to retrieve the obtained event record; and to reformat the obtained event record into a format utilized by the given complex event processing engine.

10. The method of claim 1 further comprising obtaining analysis results from the complex event processing engines and storing the analysis results in the distributed file system, the analysis results comprising detection of one or more instances of the given complex event.

11. The method of claim 1 wherein mapping the new event data as the distributed event streams comprises partitioning the new event data such that different subsets of the new event data are provided to two or more different complex event processing engines.

12. The method of claim 1 wherein the distributed file system comprises a Hadoop distributed file system (HDFS)

and at least one of the complex event processing engines comprises an Esper complex event processing engine.

13. An apparatus comprising:

at least one processing device comprising a processor coupled to a memory;

the at least one processing device being configured:

to construct at least one complex event query specification comprising one or more grouping criteria by which event data is grouped into distributed event streams, one or more filtering criteria by which individual events relevant to a given complex event are specified and one or more query statements specifying event stream processing to be performed by complex event processing engines;

to establish a time interval defining an event stream continuation interval for mapping the distributed event streams to complex event processing engines;

to analyze said at least one complex event query specification to determine a given number of different complex event processing engines and corresponding distributed event streams based on the grouping criteria in said at least one complex event query specification;

to instantiate the given number of complex event processing engines;

to activate said at least one complex event query specification in the complex event processing engines; and responsive to determining that a new event stream continuation interval has arrived based on the established time interval:

to identify new event data stored in a distributed file system relevant to said at least one complex event query specification, wherein relevance is determined based on the one or more filtering criteria in said at least one complex event query specification; and to map the new event data to respective ones of the complex event processing engines via the distributed event streams, wherein the complex event processing engines evaluates the one or more query statements of said at least one complex event query specification for the event data in the distributed event streams;

wherein the at least one processing device comprises one or more master processing nodes and one or more slave processing nodes, the complex event processing engines being instantiated on respective ones of the slave processing nodes, the slave processing nodes executing under control of the master processing nodes;

wherein the master processing nodes are configured to implement an application interface for constructing the at least one complex event processing query, to coordinate use of compute and storage resources by the complex event processing engines, to track one or more complex event processing jobs performed by the complex event processing engines, and to control and record transactions of the complex event processing jobs in a distributed file system;

wherein a given one of the slave processing nodes is configured to monitor one or more of the complex event processing jobs, to report job progress for the one or more complex event processing jobs to the master processing nodes, to perform file system transactions for one or more of the complex event processing jobs in the distributed file system, and to provide event data from the distributed file system to a given one of the complex event processing engines;

wherein said at least one complex event query specification comprises two or more complex event query specifications;

wherein a first one of the complex event processing engines and at least a second one of the complex event processing engines are activated with a same one of the two or more complex event query specifications; and wherein a third one of the complex event processing engines and at least a fourth one of the complex event processing engines are activated with different ones of the two or more complex event query specifications.

14. The apparatus of claim 13 wherein the one or more query statements of said at least one complex event query specification comprise one or more complex event query language statements that together define a complex event in terms of conditions on and relationships between individual events represented in one or more of the distributed event streams, and wherein the complex event query language utilizes an object-oriented programming paradigm where events are defined as object classes.

15. The apparatus of claim 13 wherein the master processing nodes and the slave processing nodes are part of a data warehouse comprising a plurality of equipment racks, each equipment rack comprising interconnect equipment and at least one of a process-centric appliance and a storage-centric appliance, the process-centric appliances comprising greater processing capabilities than the storage-centric appliances and the storage-centric appliances comprising larger storage capacity than the process-centric appliances, the master processing nodes being implemented by at least one of the process-centric appliances and the slave processing nodes being implemented by one or more of the storage-centric appliances.

16. A computer program product comprising a non-transitory processor-readable storage medium having stored therein program code of one or more software programs, wherein the program code when executed by at least one processing device cause the at least one processing device:

to construct at least one complex event query specification comprising one or more grouping criteria by which event data is grouped into distributed event streams, one or more filtering criteria by which individual events relevant to a given complex event are specified and one or more query statements specifying event stream processing to be performed by complex event processing engines;

to establish a time interval defining an event stream continuation interval for mapping the distributed event streams to complex event processing engines;

to analyze said at least one complex event query specification to determine a given number of different complex event processing engines and corresponding distributed event streams based on the grouping criteria in said at least one complex event query specification;

to instantiate the given number of complex event processing engines;

to activate said at least one complex event query specification in the complex event processing engines; and responsive to determining that a new event stream continuation interval has arrived based on the established time interval:

to identify new event data stored in a distributed file system relevant to said at least one complex event query specification, wherein relevance is determined based on the one or more filtering criteria in said at least one complex event query specification; and to map the new event data to respective ones of the complex event processing engines via the distributed event streams, wherein the complex event processing engines evaluates the one or more query statements of said at least one complex event query specification for the event data in the distributed event streams;

wherein the at least one processing device comprises one or more master processing nodes and one or more slave processing nodes, the complex event processing engines being instantiated on respective ones of the slave processing nodes, the slave processing nodes executing under control of the master processing nodes;

wherein the master processing nodes are configured to implement an application interface for constructing the at least one complex event processing query, to coordinate use of compute and storage resources by the complex event processing engines, to track one or more complex event processing jobs performed by the complex event processing engines, and to control and record transactions of the complex event processing jobs in a distributed file system; and wherein a given one of the slave processing nodes is configured to monitor one or more of the complex event processing jobs, to report job progress for the one or more complex event processing jobs to the master processing nodes, to perform file system transactions for one or more of the complex event processing jobs in the distributed file system, and to provide event data from the distributed file system to a given one of the complex event processing engines;

wherein said at least one complex event query specification comprises two or more complex event query specifications;

wherein a first one of the complex event processing engines and at least a second one of the complex event processing engines are activated with a same one of the two or more complex event query specifications; and wherein a third one of the complex event processing engines and at least a fourth one of the complex event processing engines are activated with different ones of the two or more complex event query specifications.

17. The computer program product of claim 16 wherein the one or more query statements of said at least one complex event query specification comprise one or more complex event query language statements that together define a complex event in terms of conditions on and relationships between individual events represented in one or more of the distributed event streams, and wherein the complex event query language utilizes an object-oriented programming paradigm where events are defined as object classes.

18. The computer program product of claim 16 wherein the master processing nodes and the slave processing nodes are part of a data warehouse comprising a plurality of equipment racks, each equipment rack comprising interconnect equipment and at least one of a process-centric appliance and a storage-centric appliance, the process-centric appliances comprising greater processing capabilities than the storage-centric appliances and the storage-centric appliances comprising larger storage capacity than the process-centric appliances, the master processing nodes being implemented by at least one of the process-centric appliances and the slave processing nodes being implemented by one or more of the storage-centric appliances.

* * * * *

UNITED STATES PATENT AND TRADEMARK OFFICE
CERTIFICATE OF CORRECTION

PATENT NO. : 9,992,269 B1
APPLICATION NO. : 14/189326
DATED : June 5, 2018
INVENTOR(S) : Jeffrey M. Odom et al.

Page 1 of 1

It is certified that error appears in the above-identified patent and that said Letters Patent is hereby corrected as shown below:

In the Specification

Column 3, Line 55, please delete "(DPS)" and replace it with --(DFS)--

Column 4, Line 37, please delete "150a-150n" and replace it with --150a-150c--

Column 4, Line 40-41, please delete "event streams 112a-212n" and replace it with --event streams 112a-112c--

Signed and Sealed this
Thirty-first Day of July, 2018

Andrei Iancu
*Director of the United States Patent and Trademark Office*